United States Patent
Hessling von Heimendahl et al.

(10) Patent No.: US 9,889,948 B2
(45) Date of Patent: Feb. 13, 2018

(54) GROUND ILLUMINATION AIRCRAFT LIGHT UNIT AND AIRCRAFT COMPRISING THE SAME

(71) Applicant: Goodrich Lighting Systems GmbH, Lippstadt (DE)

(72) Inventors: Andre Hessling von Heimendahl, Koblenz (DE); Christian Schoen, Mainz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 68 days.

(21) Appl. No.: 14/870,761

(22) Filed: Sep. 30, 2015

(65) Prior Publication Data

US 2016/0096635 A1    Apr. 7, 2016

(30) Foreign Application Priority Data

Oct. 2, 2014    (EP) .................................... 14187524

(51) Int. Cl.
  *B64D 47/02*    (2006.01)
  *B64D 47/06*    (2006.01)
  *F21W 101/06*    (2006.01)

(52) U.S. Cl.
  CPC ............ *B64D 47/02* (2013.01); *B64D 47/06* (2013.01); *B64D 2203/00* (2013.01); *F21W 2101/06* (2013.01)

(58) Field of Classification Search
  CPC .... B64D 47/02; B64D 47/06; B64D 2203/00; F21W 2101/06
  See application file for complete search history.

(56) References Cited

U.S. PATENT DOCUMENTS

| | | | | |
|---|---|---|---|---|
| 2,832,059 | A | * | 4/1958 | Adler, Jr. ............... B64D 47/06 340/981 |
| 2,938,192 | A | * | 5/1960 | Adler, Jr. ............. B60Q 1/2611 340/981 |
| 5,813,744 | A | * | 9/1998 | Altebarmakian ...... B64D 47/04 244/1 R |
| 6,191,541 | B1 | | 2/2001 | Patel et al. |

(Continued)

FOREIGN PATENT DOCUMENTS

WO    2011045001 A2    4/2011

OTHER PUBLICATIONS

Blondeau Jean FTI Technologies GMBH, "EP2010006142 Warning Light for Aircraft", Apr. 21, 2011, WIPO Patentscope English Translation of WO2011045001A2, pp. 1-5.*

(Continued)

*Primary Examiner* — Alan Cariaso
(74) *Attorney, Agent, or Firm* — Cantor Colburn LLP

(57) ABSTRACT

A ground illumination aircraft light unit has an operating light emission distribution for illuminating a ground area below an aircraft, wherein the ground illumination aircraft light unit is configured to be mounted to an underside of an aircraft fuselage, and wherein the operating light emission distribution includes a straight downward emission direction normal to the ground area and covers a solid angle of illumination around the straight downward emission direction, wherein the solid angle of illumination is at least 1.3 π sr.

18 Claims, 6 Drawing Sheets

(56) References Cited

U.S. PATENT DOCUMENTS

| | | | |
|---|---|---|---|
| 6,252,525 B1 * | 6/2001 | Philiben | G01S 1/70 340/961 |
| 6,507,290 B1 | 1/2003 | Lodhie et al. | |
| 6,669,357 B2 * | 12/2003 | Konicke | B64D 47/04 244/1 R |
| 6,940,424 B2 * | 9/2005 | Philiben | B64D 47/06 340/435 |
| 7,434,970 B2 * | 10/2008 | MacHi | B64D 47/06 362/470 |
| 8,192,060 B2 * | 6/2012 | Wilkinson | H05B 33/0866 340/815.45 |
| 9,469,415 B1 * | 10/2016 | Harvey | B64D 47/06 |
| 2003/0058653 A1 | 3/2003 | Konicke et al. | |
| 2012/0140498 A1 * | 6/2012 | Fabbri | B64D 47/04 362/470 |
| 2015/0232198 A1 * | 8/2015 | Seibt | B64D 47/02 362/470 |

OTHER PUBLICATIONS

European Search Report for application No. EP 14187524.5; dated Mar. 18, 2015, 6 pages.

* cited by examiner

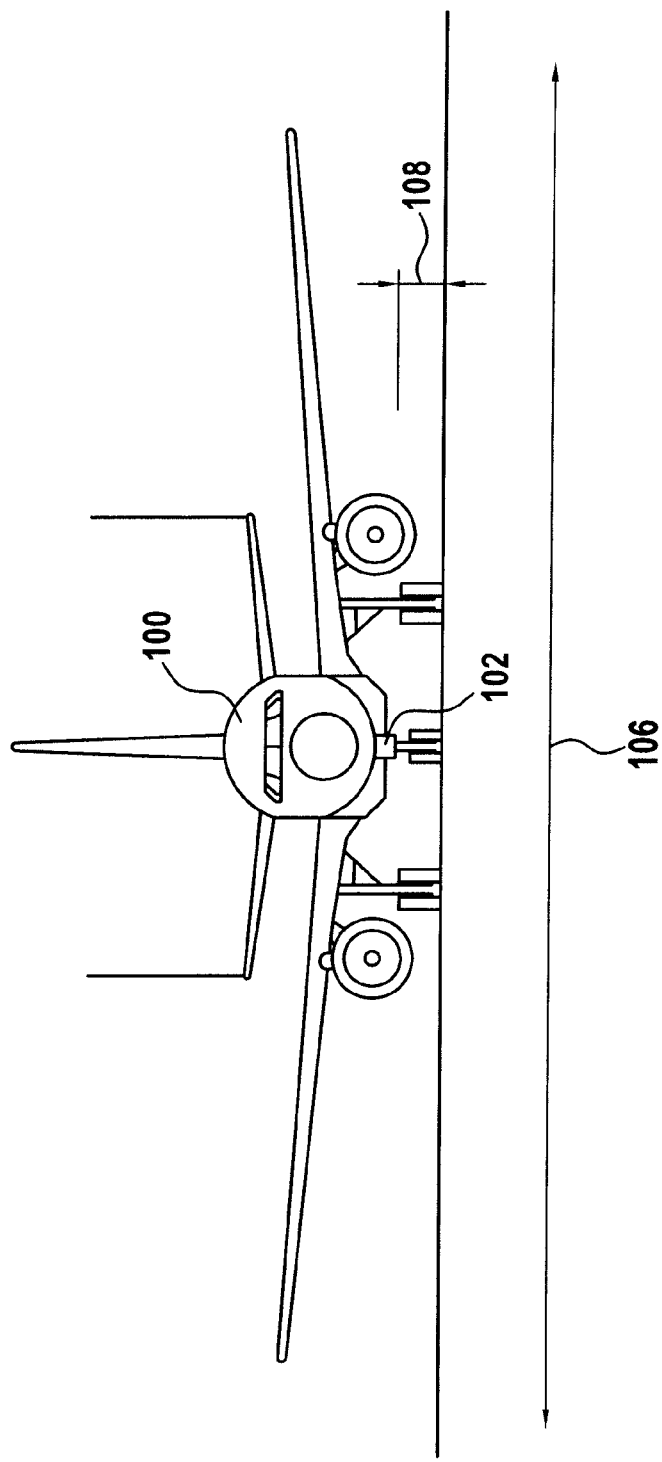

GROUND ILLUMINATION AIRCRAFT LIGHT UNIT AND AIRCRAFT COMPRISING THE SAME

FOREIGN PRIORITY

This application claims priority to European Patent Application No. 14187524.5 filed Oct. 2, 2014, the entire contents of which is incorporated herein by reference.

TECHNICAL FIELD

The present invention is in the field of exterior aircraft lighting. In particular, the present invention relates to lighting systems that are used when the aircraft is on the ground.

BACKGROUND OF THE INVENTION

Large commercial aircraft have a wide range of exterior lights. Examples of exterior lights are landing and take off lights, taxi and runway turn off lights, white strobe anti-collision lights, red beacon lights, navigation lights, wing and engine scan lights, logo lights, cargo loading lights, and emergency lights. With the consistent development of new aircraft models, there is a constant need to adapt the whole exterior lighting system to the new models and to constantly re-design all the light units. This re-design is challenging, because the resulting light intensity distributions have to satisfy Federal Aviation Regulation (FAR) requirements, quasi-standard recommendations, aircraft manufacture demands, etc. In this environment, it is desirable to have as much flexibility with respect to the light unit design as possible.

Accordingly, it would be beneficial to provide an exterior aircraft light unit that helps in increasing the flexibility for the overall exterior lighting design.

SUMMARY

Exemplary embodiments of the invention include a ground illumination aircraft light unit with an operating light emission distribution for illuminating a ground area below an aircraft, wherein the ground illumination aircraft light unit is configured to be mounted to an underside of an aircraft fuselage, and wherein the operating light emission distribution includes a straight downward emission direction normal to the ground area and covers a solid angle of illumination around the straight downward emission direction, wherein the solid angle of illumination is at least $1.3\,\pi$ sr.

Exemplary embodiments of the invention allow for providing an aircraft light unit that is purely dedicated to illuminating the ground underneath the aircraft. By being solely dedicated to this purpose, the ground illumination aircraft light unit can be kept small, adding only a low amount of drag to the aircraft, and can be designed in a way to consume low amounts of power. By providing dedicated ground illumination via the ground illumination aircraft light unit, other light units can be freed of their requirement to illuminate the ground area below the aircraft, thus allowing for those light units to be designed differently and/or to be arranged in different positions.

For example, when used as part of the beacon light system, the ground illumination aircraft light unit may allow for the other beacon lights to be freed from the requirement to illuminate the ground area below the aircraft, such that their design and/or positioning may be altered without violating FAR requirements. In this way, it may be possible to reduce the overall drag induced by the beacon light system. It is also possible to use the ground illumination aircraft light unit to assume some or all of the functionality of the cargo loading lights, thus making their design and/or positioning more flexible. Further, the ground illumination aircraft light unit may also be used for entirely new applications, such as a parking position signal light. In particular, when an aircraft is parked on the airfield and all its other exterior lights are switched off, the ground illumination aircraft light unit may illuminate the ground area below the aircraft and thus warn other aircraft and/or airport vehicles with respect to the presence of an otherwise non-illuminated object.

The term operating light emission distribution refers to the light emission distribution as emitted by the ground illumination aircraft light unit in operation. This operating light emission distribution is configured to illuminate a ground area below the aircraft. The illuminated ground area is an area that is fully contained in, overlaps with or fully contains a projected extension of the aircraft to the ground. The projected extension of the aircraft to the ground is a circular area whose diameter equals the extension of the aircraft at its point of largest extension. The projected extension of the aircraft is a circular area that surrounds the projection of the contour of the aircraft from a top view to the ground.

The ground illumination aircraft light unit is configured to be mounted to an underside of an aircraft fuselage. In other words, the ground illumination aircraft light unit has a mounting structure that allows for the mounting of the ground illumination aircraft light unit to the underside of the aircraft fuselage. This mounting structure and the operating light emission distribution have such a spatial arrangement with respect to each other that the operating light emission distribution includes the straight downward emission direction. The straight downward emission direction is defined as the direction extending through the ground illumination aircraft light unit normal to the ground underneath the aircraft. In other words, the straight downward emission direction refers to the direction that has the smallest distance between the ground illumination aircraft light unit and the ground.

The operating light emission distribution covers a solid angle of illumination around the straight downward emission direction. In other words, the ground area illuminated by the ground illumination aircraft light unit includes the straight downward emission direction and a solid angle that includes and surrounds said straight downward emission direction. This solid angle of illumination is at least $1.3\,\pi$ sr.

In case the operating light emission distribution is a regular cone-shaped light emission distribution, the solid angle of illumination of $1.3\,\pi$ sr roughly corresponds to a cone having a 70° angle of the side surface of the cone with respect to the center line of the cone. In case the operating light emission distribution is cone-shaped, the correspondence between the solid angle of illumination and the opening angle of the cone can be calculated according to the formula of $\Omega = 2\pi(1-\cos\theta)$ sr, with $\Omega$ referring to the solid angle and with $\theta$ referring to the opening angle of the cone. It is explicitly pointed out, however, that the solid angle of illumination may have any other shape than a spherical cap (which is the case for a cone-shaped light emission distribution) and may be an irregularly shaped solid angle. The given conversion between the solid angle and the opening angle of a cone-shaped operating light emission distribution is for illustrative purposes, in order to enable a more intuitive visualization of the given solid angle values.

With a solid angle of illumination of at least 1.3 π sr, a large portion of the projected extension of the aircraft to the ground may be illuminated for a wide range of aircraft types, such that the overall requirements for the remainder of the exterior aircraft lighting system may be freed from part of the constrains and/or such that additional lighting functionality, such as park signal functionality, may be achieved.

According to a further embodiment, the solid angle of illumination may be a continuous solid angle of illumination. In other words, the operating light emission distribution may be free of blind spots within the solid angle of illumination.

The operating light emission distribution covers a solid angle of illumination. The illumination of the ground area may fade out towards its edges. Accordingly, the covered solid angle may be defined by an illumination threshold. In particular, the solid angle of illumination may be regarded as that set of emission directions where an illuminance on the ground is more than 10% of a maximum illuminance on the ground. In other words, the solid angle may be regarded as the entirety of all those directions where the illuminance on the ground is more than 10% of the maximum illuminance on the ground. The illuminance values may be measured in the absence of any other light source except for the ground illumination aircraft light unit.

According to a further embodiment, the solid angle of illumination is at least 1.65 π sr. In this way, an even larger ground area below the aircraft may by illuminated. For various types of aircraft, such an illuminated ground are may substantially correspond to the projected extension of the aircraft. As the resulting illumination of the ground may cover substantially all of the projected extension of the aircraft, this ground illumination may allow to move other light units that were previously mounted to the aircraft body to outside locations of the aircraft, such as to the wing tips and to the tail.

According to a further embodiment, the operating light emission distribution encompasses a cone of illumination having an opening angle of at least 70°, in particular of at least 80°, in all directions with respect to the straight downward emission direction. The cone of illumination having an opening angle of at least 70°, in particular of at least 80°, corresponds to the operating light emission distribution having an opening angle of at least 140°, in particular of at least 160°, in all vertical cross-sections through the ground illumination aircraft light unit. In this way, it is ensured that the operating light emission distribution at least contains this cone of illumination, which cone of illumination corresponds to a circular illuminated ground area below the aircraft. It is pointed out that the term encompassing a cone of illumination does not preclude the operating light emission distribution to have parts outside of said cone of illumination. Said cone of illumination is a part of the operating light emission distribution. It may also constitute the whole operating light emission distribution, but does not necessarily constitute the whole operating light emission distribution.

According to a further embodiment, the ground area below the aircraft, being illuminated in operation, encompasses a circular illuminated area, whose diameter is at least 70%, in particular at least 80%, further in particular at least 90%, of an extension of the aircraft at its point of largest extension. In other words, the diameter of the circular illuminated area may be at least 70%, in particular at least 80%, further in particular at least 90% of a circular area circumscribing the projected extension of the aircraft to the ground. The diameter of the circular illuminated area may also be at least 100% of the extension of the aircraft at its point of largest extension. By providing a circular illuminated area with the diameters stated above, a large portion of or even all of the ground below the aircraft is illuminated by the ground illumination aircraft light unit. It is pointed out that the terminology of the ground area encompassing said circular illuminated area does not preclude the illuminated ground area to be larger than said circular illuminated area in one or more dimensions. The given terminology just means that the illuminated ground area below the aircraft comprises at least said circular illuminated area. The circular illuminated area may be around the straight downward emission direction. In particular, the straight downward emission direction may define the center point of the circular illuminated area.

According to a further embodiment, an illuminance ratio between a point of highest illuminance and a point of lowest illuminance within a portion of the circular illuminated area having an angle of more than 20° with respect to the straight downward emission direction is at most 5, in particular at most 3, further in particular at most 2. In this way, a particularly even illumination of the illuminated ground area below the aircraft is achieved. This allows for particularly good visibility of the edges of the illuminated ground area, as the human eye tends to adapt to the spots of brightest illumination and tends to disregard areas that are significantly less illuminated, in particular areas having an illumination of an order of magnitude less.

The given values for the illuminance ratio may be present in at least a portion of the circular illuminated area, i.e. at least in a sub-area of the circular illuminated area. This sub-area is defined by those points that are reached at an angle of more than 20° with respect to the straight downward emission direction, when seen from the ground illumination aircraft light unit. In this way, the angle of 20° with respect to the straight downward emission direction constitutes an inner end of said portion of the circular illuminated area. For the purpose of the measurement of the illuminance ratio, said portion of the circular illuminated area may additionally have an outer end. It may be defined that the portion of the circular illuminated area is is defined by those points that have an angle of more than 20° with respect to the straight downward emission direction and that are within a specific circular illuminated area around the straight downward emission direction, with the specific circular illuminated area having a diameter of exactly 70% or exactly 80% or exactly 90% of the extension of the aircraft at its point of largest extension. In other words, the portion of the circular illuminated area may have an inside border and an outside border, with the circular illuminated area possibly extending towards the inside and/or towards the outside of said border. In yet other words, it is possible that the highly even illumination may be present for above defined sub-portion of the ground area illuminated in operation and not for the entire circular illuminated area. However, it is also possible that above stated values for the evenness of the illumination apply to the entire circular illuminated area or even to the entire illuminated ground area below the aircraft.

According to a further embodiment, for all positions outside of a fading distance from a ground position straight downward from the ground illumination aircraft light unit, illuminance values on the ground are below 10% of a maximum illuminance value in the ground area below the aircraft, with the fading distance being less than 65%, in particular less than 60%, of an extension of the aircraft at its point of largest extension. In this way, it can be ensured that the illuminated ground area below the aircraft ends close to the projected extension of the aircraft to the ground. Accordingly, the illumination provided by the ground illumination aircraft light unit does not interfere with the illumination provided by other aircraft on an airfield. Also, the illumination of the ground area below the aircraft may thus be adapted to give a very good indication of the extension of the aircraft on the airfield to ground personal and/or passengers and/or other persons on the airfield. This may be of high signalling and/or safety value.

According to a further embodiment, the operating light emission distribution is substantially rotationally symmetric. In this way, analogous all-around illumination can be achieved within the solid angle of illumination.

According to a further embodiment, the ground illumination aircraft light unit comprises at least one LED for illuminating the ground area below the aircraft. In particular, the ground illumination aircraft light unit may comprise a plurality of LEDs for illuminating the ground area below the aircraft. LEDs are particularly space- and power-efficient means for achieving the operating light emission distribution. The ground illumination aircraft light unit may comprise an optical system that transforms the source side-light intensity distribution, as emitted by the at least one LED, into the operating light emission distribution.

According to a further embodiment, the ground illumination aircraft light unit is a beacon light unit, having a flashing mode of operation. The ground illumination aircraft light unit may emit a sequence of flashes in operation, in particular a periodical pattern of flashes. The ground illumination aircraft light unit may emit light of an aviation red color. Aviation red is a color often used for aircraft lighting and known to the skilled person. When the ground illumination aircraft light unit is used as a beacon light unit, it is able to alert the ground personnel underneath the aircraft that the aircraft engines are running. As the ground personnel underneath the aircraft is warned by the ground illumination aircraft light unit, other beacon light units may be moved to outside positions of the aircraft where their light output cannot reach the ground area under the aircraft, but where they may be able to more efficiently provide other aspects of the required beacon light functionality.

According to a further embodiment, the ground illumination aircraft light unit is a parking position signal light unit, having a continuous light emission mode of operation. In this way, the parking position of the aircraft may be indicated via the continuous illumination of a comparably large ground area under the aircraft. The comparably large area of illumination not only makes the position of the aircraft better visible than a point light source, it also allows for a slight illumination of the aircraft itself via light reflections from the ground. In this way, basic information about the aircraft, such a basic size and aircraft type information, may be visible via indirect lighting. This indirect illumination of the aircraft may also be visually appealing to passengers approaching the aircraft at night. The light emitted in the continuous light emission mode of operation may be of any color. In particular, the light may be of a color that is not commonly used in aircraft lighting, such as blue, in order to distinguish the new functionality of this parking position signal light from previous lighting functionalities.

According to a further embodiment, the ground illumination aircraft light unit is a combined beacon light and parking position signal light unit, having a flashing mode of operation and a continuous light emission mode of operation, with the ground illumination aircraft light unit having a switching circuit for selectively activating one of the flashing mode of operation and the continuous light emission mode of operation. In this way, the beacon light functionality and the parking position signal light functionality may be combined in one light unit.

Exemplary embodiments of the invention further include a set of beacon light units, comprising a ground illumination aircraft light unit, as described in any of the embodiments above, a right wing tip beacon light unit, a left wing tip beacon light unit, and a tail beacon light unit. In this way, it is possible that these four light units fulfil all beacon light requirements that were assumed by a top beacon light unit on top of the aircraft fuselage and by a bottom beacon light unit attached to the underside of the aircraft fuselage in prior art approaches. As the ground illumination aircraft light unit only needs to illuminate the ground for alerting ground personnel and does not have to satisfy further beacon light requirements, such as a strong light emission in a horizontal plane, it can be designed much smaller than the prior art bottom beacon light unit, significantly reducing the drag thereof. The other beacon light units may be freed from the requirement of illuminating the ground area under the aircraft on the airfield, such that they can be mounted in space efficient ways to the wing tips and the tail of the aircraft, where they do not add any drag. The overall aerodynamic efficiency of the aircraft may be improved by such a set of beacon light units, while FAR requirements may still be complied with.

The right wing beacon light unit may be configured to be mounted to a right wing structure of the aircraft. The left wing beacon light unit may be configured to be mounted to a left wing structure of the aircraft. The tail beacon light unit may be configured to be mounted to a tail structure of the aircraft.

According to a further embodiment, the ground illumination aircraft light unit may be synchronized to the right wing tip beacon light unit, to the left wing tip beacon light unit, and to the tail beacon light unit. This synchronization may be such that the light flashes emitted by these four light units are adapted to each other with respect to their timing and/or their duration. This adaptation does not necessarily mean that the flashes are emitted at the same times and with the same lengths by the four light units. While this is possible, a lower level of synchronization is also possible. For example, it is possible that the ground illumination aircraft light unit, the right wing tip beacon light unit, the left wing tip beacon light unit and the tail beacon light unit are synchronized in such a way that the total number of flashes that may be observed in any viewing direction is at or below the maximum allowable number of beacon light flashes per time interval according to the FAR.

According to a further embodiment, the ground illumination aircraft light unit provides near field illumination and the right wing tip beacon light unit, the left wing tip beacon light unit and the tail beacon light unit provide far field illumination. In the field of aircraft lighting, the border between near field illumination and far field illumination may be considered as the distance at which all lights of the aircraft are seen as a single light source. This may be considered to be at 15-40 times the wing span of the aircraft. While the emissions of the right wing tip beacon light unit, the left wing tip beacon light unit and the tail beacon light unit are powerful enough to provide far field illumination, the ground illumination aircraft light unit is not.

According to a further embodiment, each of the right wing tip beacon light unit, the left wing tip beacon light unit and the tail beacon light unit has a respective warning light emission distribution, with the warning light emission distribution of each of the right wing tip beacon light unit, the left wing tip beacon light unit and the tail beacon light unit having a first light emission opening angle of at least 150° in a first cross-sectional plane, and a second light emission opening angle of at most 180° in a second cross-sectional plane orthogonal to the first cross-sectional plane, wherein each of the right wing tip beacon light unit, the left wing tip beacon light unit and the tail beacon light unit is configured in such a way that it is mountable to the aircraft with the first cross-sectional plane being oriented in a vertical direction and the second cross-sectional plane being oriented in a horizontal direction, and wherein the first light emission opening angle extends at least 75° both above and below the second cross-sectional plane. On the one hand, such a design of the right wing tip, left wing tip and tail beacon light unit allows for covering the entire far field vertical light emission distribution, as required by the FAR and as split up between two beacon lights in prior art approaches. On the other hand, the exemplary embodiment of the invention has an opening angle of at most 180° in the horizontal cross-sectional plane, as compared to the 360° opening angle of prior art beacon lights. By eliminating the 360° opening angle of the beacon light in the horizontal cross-sectional plane, the beacon light units can be made a lot more compact and designed in such a way that it can be included in areas of the plane where space is a scarce resource, such as the wing-tips or the tail of the aircraft.

According to a further embodiment, the warning light emission distribution of one or more or all of the right wing tip, left wing tip and tail beacon light units is symmetric with respect to the second cross-sectional plane. In other words, the right wing tip, left wing tip and tail beacon light units are designed in such a way that the light emission distribution in the Northern hemisphere corresponds to the light emission distribution in the Southern hemisphere for the sector defined by the first light emission opening angle. Accordingly, an equal warning illumination towards the top and towards the bottom is ensured by the one or more or all of the right wing tip, left wing tip and tail beacon light units in accordance with this exemplary embodiment.

According to a further embodiment, the warning light emission distribution of one or more or all of the right wing tip, left wing tip and tail beacon light units in the first cross-sectional plane satisfies a set of minimum requirements of a predefined vertical light emission distribution of an aircraft beacon light unit. In this way, the right wing tip, left wing tip and tail beacon light units are adapted to be used for aircraft where a particular set of minimum requirements for the beacon light intensity distribution exists. According to a particular embodiment, the set of minimum requirements is defined by Federal Aviation Regulation §25.1401. In this way, the one or more or all of the right wing tip, left wing tip and tail beacon light units provides for a vertical light emission distribution that is in compliance with said section of the FAR.

According to a further embodiment, the light intensity values of the warning light emission distribution of one or more or all of the right wing tip, left wing tip and tail beacon light units are at least equal to the following values in the first cross-sectional plane: 400 cd for a first angular range of between 0° and ±5° with respect to the second cross-sectional plane; 240 cd for a second angular range of between ±5° and ±10° with respect to the second cross-sectional plane; 80 cd for a third angular range of between ±10° and ±20° with respect to the second cross-sectional plane; 40 cd for a fourth angular range of between ±20° and ±30° with respect to the second cross-sectional plane; and 20 cd for a fifth angular range of between ±30° and ±75° with respect to the second cross-sectional plane. The expression of the light intensity values being at least equal to particular values is to be understood in such a way that the light intensity values of the warning light emission distribution are greater or equal to the given number values. The expression of "±x° and ±y° with respect to the second cross-sectional plane" is understood to include both sub-ranges of between +x° and +y° with respect to the second cross-sectional plane and between −x° and −y° with respect to the second cross-sectional plane.

According to a further embodiment, the first light emission opening angle of the warning light emission distribution of one or more or all of the right wing tip, left wing tip and tail beacon light units is at most 180°. By keeping the first light emission opening angle at or below 180°, an overlap between light emission from the right wing tip, left wing tip and tail beacon light units can be kept small, and the whole illumination capacity of the light sources of the right wing tip, left wing tip and tail beacon light units may be used for the desired range in the vertical direction.

According to a further embodiment, the second light emission opening angle of the warning light emission distribution of one or more or all of the right wing tip, left wing tip and tail beacon light units is between 60° and 180°, in particular between 90° and 150°. In this way, the horizontal opening angle of the right wing tip, left wing tip and tail beacon light units can be kept in a range where an unobstructed light emission is made possible from the aircraft, in particular from locations of the aircraft that are remote from its center. Also, by keeping the second light emission opening angle in the given range, a compact design of the right wing tip, left wing tip and tail beacon light units may be ensured.

Exemplary embodiments of the invention further include an aircraft comprising a ground illumination aircraft light unit in accordance with any of the embodiments described above. In a particular embodiment, the aircraft comprises a set of beacon light units, as described with respect to any of the embodiments above. The modifications, additional features and advantages, described above with respect to the ground illumination aircraft light unit and with respect to the set of beacon light units, apply to the aircraft in an analogous manner.

BRIEF DESCRIPTION OF DRAWINGS

Further exemplary embodiments of the invention are described below with respect to the accompanying drawings, wherein:

FIG. 2a-FIG. 2c shows an aircraft equipped with a ground illumination aircraft light unit in accordance with an exemplary embodiment of the invention in a front view, a top view, and a side view.

DETAILED DESCRIPTION OF THE INVENTION

Figure 1A:
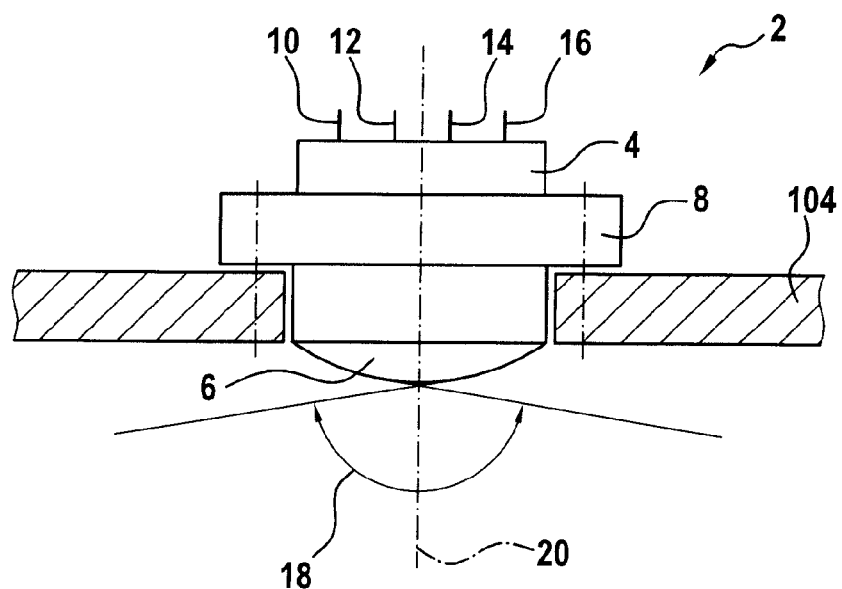
FIG. 1a-FIG. 1b shows a ground illumination aircraft light unit in accordance with an exemplary embodiment of the invention in a schematic view.

FIG. 1a shows a schematic side view of an exemplary ground illumination aircraft light unit 2 in accordance with an exemplary embodiment of the invention. The ground illumination aircraft light unit, also referred to as ground illumination unit herein, comprises a housing 4 and a lens cover 6. A plurality of LEDs are disposed within the housing 4 for providing the illuminating power of the ground illumination unit 2. The housing 4 extends through a mounting structure 8, which mounting structure 8 is fixedly attached to the housing 4 and to a belly faring 104 of an aircraft. The belly faring 104 is a part of an underside of the aircraft.

The ground illumination unit 2 has four inputs/connections 10, 12, 14 and 16, namely a power input 10, a ground connection 12, a mode selection input 14, and a synchronization input 16. The power input 10 is connected to a suitable power source, such as the aircraft power network. The mode selection input 14 and the synchronization input 16 are coupled to associated switches in the aircraft cockpit and/or to the aircraft board computer for receiving appropriate command data.

The ground illumination unit 2 is mounted to the belly faring 104 in such a way that a center line 20 through the ground illumination unit 2 corresponds to a direction normal to the ground area below the aircraft. This direction 20 is also referred to as the straight downward emission direction 20 of the ground illumination unit 2. In operation, the ground illumination unit 2 emits light with an operating light emission distribution. In the exemplary embodiment of FIG. 1a, the operating light emission distribution has an opening angle 18 of 170° in a vertical cross-sectional plane through the center of the ground illumination unit 2. The details of operating light emission distributions that can be achieved with exemplary ground illumination aircraft light units in accordance with the invention will be described below.

In operation, the ground illumination unit 2 is powered via the power received through the power input 10. Depending on the data received via the mode selection input 14, the ground illumination unit 2 operates in one of two operating modes. In particular, the ground illumination unit may operate in a flashing mode of operation or in a continuous light emission mode of operation. In the flashing mode of operation, the ground illumination unit 2 may emit flashes of an aviation red color in accordance with a predefined flash pattern. In this way, the ground illumination unit 2 may work as a part of the beacon light system of the aircraft in the flashing mode of operation. In this flashing mode of operation, the synchronization information received via the synchronization input 16 serves to synchronize the ground illumination unit 2 with the other lights of the beacon light system. In this way, it is ensured that a maximum number of flashes, as defined by the FAR requirements for beacon lights, is not exceeded.

In the continuous light emission mode of operation, the ground illumination unit 2 constantly emits light with the operating light emission distribution. The light emitted in the continuous light emission mode of operation may have any suitable color. In particular, it may have a color that is not otherwise associated with particular warning lights, such as a blue color for example. In this continuous light emission mode of operation, the ground illumination unit 2 may illuminate the ground area below the aircraft and thus may signal the aircraft position. This functionality is particularly relevant in terms of position signalling and safety when all other lights are turned off. However, this continuous light emission mode of operation may also be an additional source of illumination in addition to other parking lights.

Figure 1B:
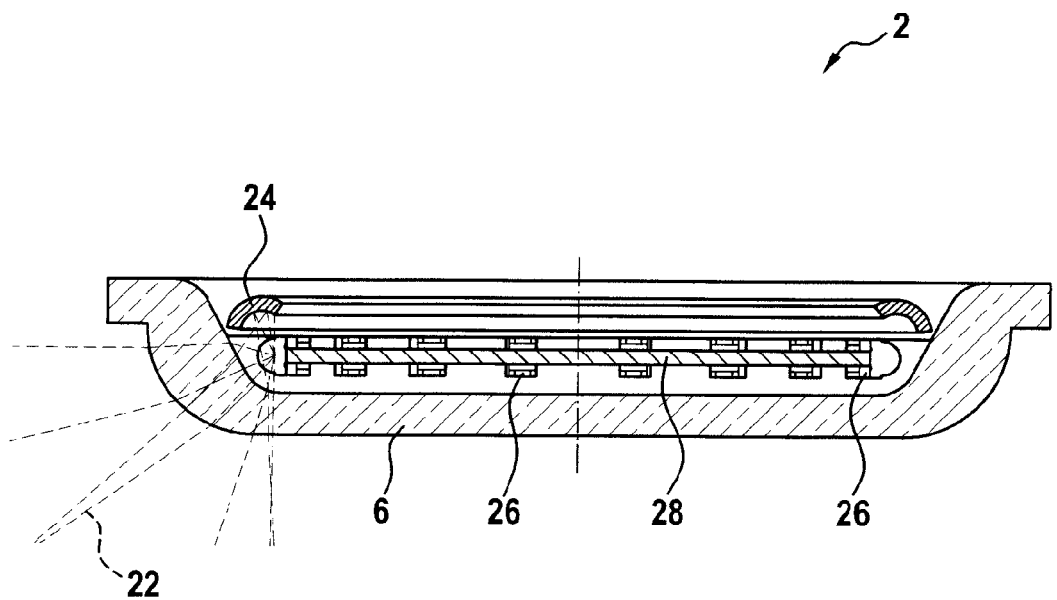

FIG. 1b shows a cross-sectional view through an exemplary ground illumination aircraft light unit 2 in accordance with an exemplary embodiment of the invention. This view illustrates the path exemplary light rays 22 travel from the plurality of LEDs 26 through the lens cover 6. The LEDs 26 are arranged around a circular disc 28 for providing a rotationally symmetric light intensity distribution. The lens cover 6 and a circular reflector 24 constitute the optical system of the ground illumination unit 2, which shapes the operating light emission distribution present on an outside of the ground illumination unit 2. It is pointed out that a wide range of optical systems are possible for achieving the desired operating light emission distribution, with FIG. 1b showing an example only.

FIG. 2a shows an exemplary aircraft 100, equipped with a ground illumination unit 102 in accordance with an exemplary embodiment of the invention, in a front view. The ground illumination unit 102 in operation illuminates a ground area 106 below the aircraft. In the exemplary embodiment of FIG. 2a, the lateral extension of the ground area 106 is about 35 m. This is slightly more than the wing span of 34.1 meter of an Airbus A320®, as depicted in FIG. 2a. The ground illumination unit 102 is mounted to the underside of the aircraft 100, resulting in a distance 108 to ground of about 2.5 m. Given the lateral extension of the illuminated ground area 106 of 35 m and given the distance 108 to ground of the ground illumination unit 102 of 2.5 m, the opening angle of the operating light emission distribution of the exemplary ground illumination unit in a vertical lateral cross-section is about 164°.

Figure 2B:
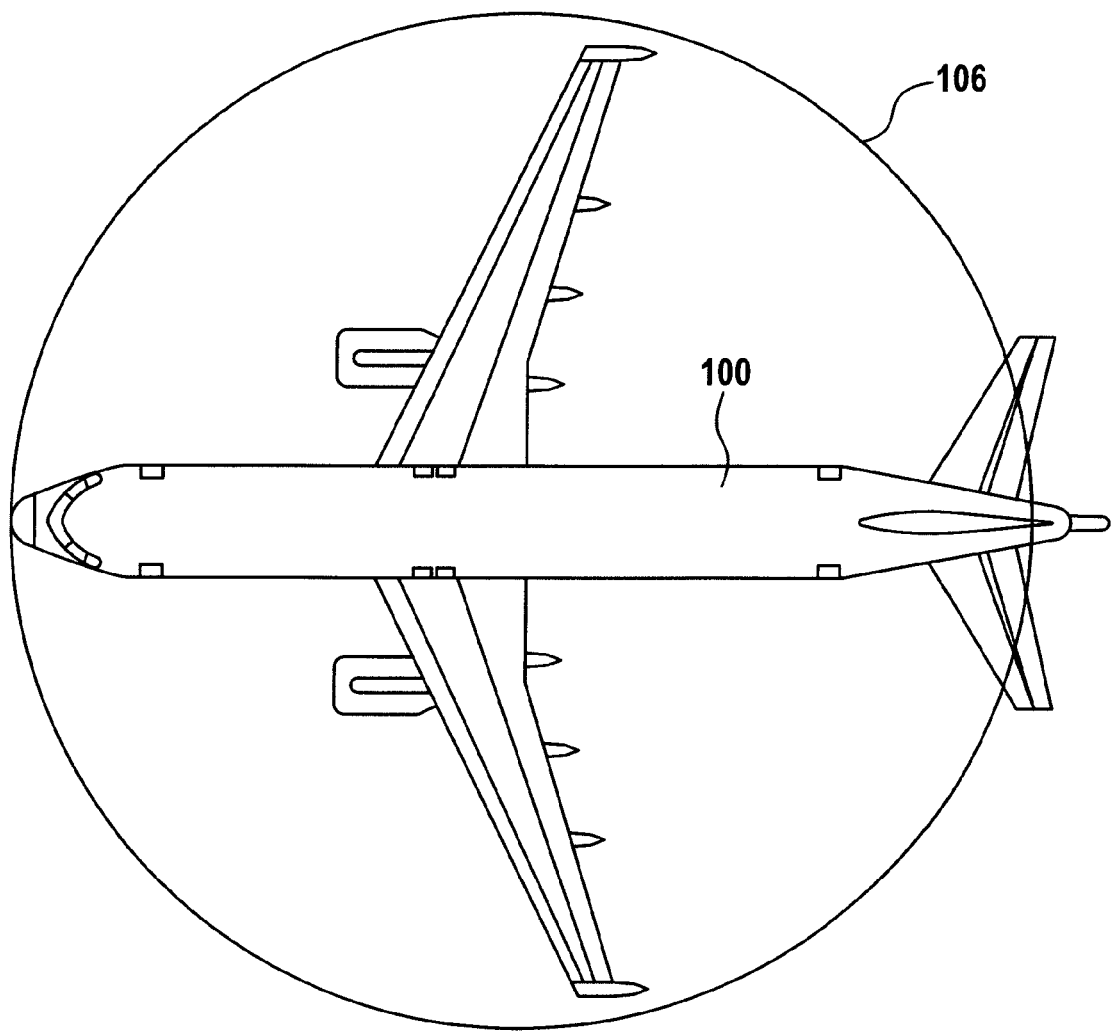

FIG. 2b shows the exemplary aircraft 100 of FIG. 2a and the illuminated ground area 106 in a top view. It can be seen that the illuminated ground area 106 is circular and substantially corresponds to a circle circumscribing the projection of the aircraft 100 onto the ground. In the exemplary embodiment of FIG. 2b, the horizontal stabilizers of the aircraft tail and the part of the aircraft tail behind the horizontal stabilizers are disregarded for the projection of the aircraft onto the ground. It is, however, also possible to include the horizontal stabilizers and the very back of the aircraft tail into the projection, leading to a slightly larger illuminated ground area 106. The illuminated ground area 106 is circular in shape and has a diameter of 35 m. Given this value and the distance 108 to ground of the ground illumination unit 102, the solid angle of illumination of the ground illumination unit 102 of the exemplary embodiment of FIG. 2b is about 1.72 $\pi$ sr.

Figure 2C:
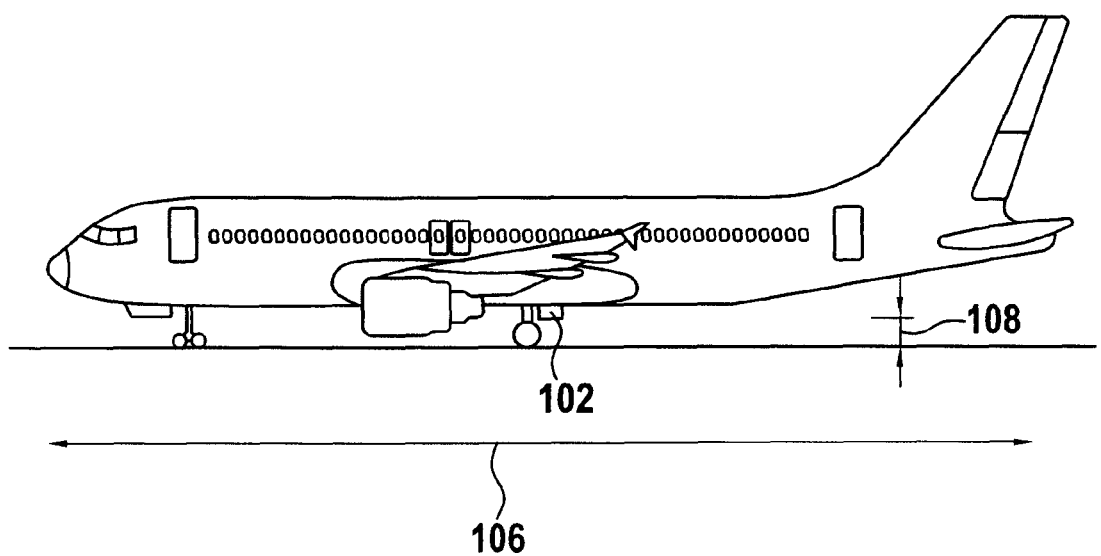

FIG. 2c shows the exemplary aircraft 100 of FIGS. 2a and 2b in a side view. The longitudinal extension of the illuminated ground area 106 is illustrated in relation to the length of the aircraft 100. Also, the distance 108 to ground of the ground illumination unit 102 is illustrated. Again, an opening angle of about 164° of the operating light emission distribution is present, also for the vertical longitudinal cross-section through the ground illumination unit 102. As the operating light emission distribution has a cone shape in the exemplary embodiment of FIG. 2, this opening angle of 164° of the operating light emission distribution corresponds to an opening angle of about 82° of the cone of illumination, with the opening angle of the cone being calculated as the angle of the side face of the cone with respect to the center line of the cone.

Figure 3:
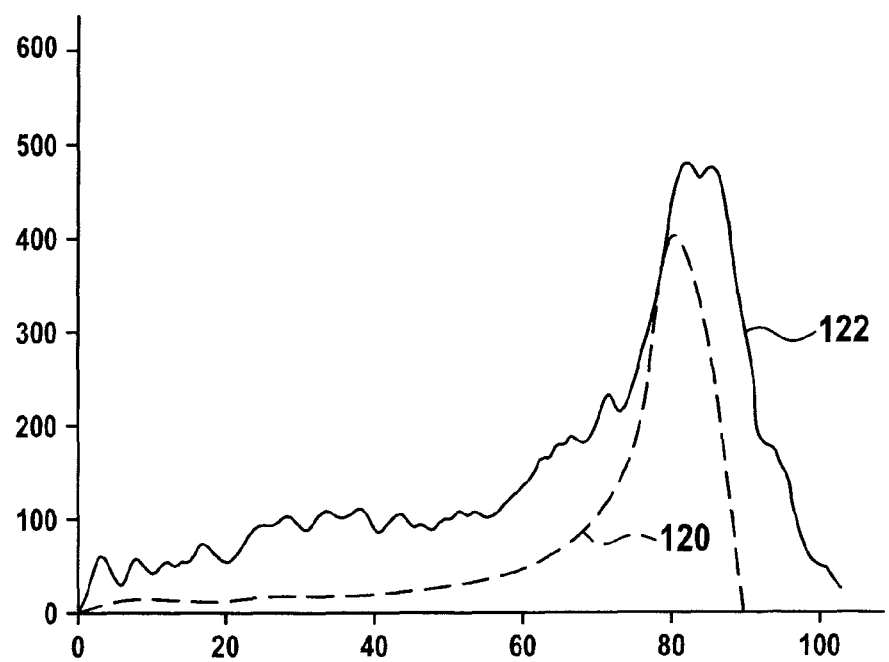
FIG. 3 shows a light intensity distribution of a ground illumination aircraft light unit in accordance with an exemplary embodiment of the invention.

FIG. 3 shows two exemplary operating light emission distributions 120, 122. The operating light emission distributions are shown as angular values with respect to the straight downward emission direction, which has the angle of 0°. The first operating light emission distribution 120 is an ideal operating light emission distribution. The ideal operating light emission distribution 120 monotonically increases with increasing angles up to the angle of 80°. In particular, it increases in such a way that the increase compensates for the decrease in illuminance, which is due the increase in distance of the ground from the ground illumination unit for larger angles. As the desired cut-off of the ground illumination is around 80°, the light intensity decreases rapidly between 80° and 90°. The result of this ideal light intensity distribution 120 is an even illuminance of the ground area below the aircraft for the entire area of the projected extension of the aircraft and a prompt fading out of the illumination right outside of the projected area of the aircraft.

The operating light emission distribution 122 is the result of an implementation of the ground illumination unit with a one-piece optical system, consisting of a free-form lens, and a plurality of LEDs being arranged in a circular arrangement. This second operating light emission distribution 122 closely tracks the first operating light emission distribution 120. It also provides for a fairly even illuminance in the illuminated ground area and for a sharp fading out of the illuminance outside of the projected aircraft extension. The operating light emission distribution has a peak effective intensity value of about 100 cd. The conversion between the intensity, shown in FIG. 3, and the effective intensity, which takes into account the human perception of the light intensity of flashes, is carried out via the Blondel Rey equation, known to the skilled person.

The operating light emission distribution 122 may be present in selected vertical cross-sections through the ground illumination unit or may be present in this or a slightly altered form in all vertical cross-sections through the ground illumination unit.

As discussed in detail above, the ground illumination units in accordance with exemplary embodiments of the invention may provide for a near field illumination on the ground. Such a ground illumination unit may be used in a set with further beacon light units that provide for the far field illumination. FIG. 4 shows an arrangement of exemplary right wing tip, left wing tip and tail beacon light units that may be used together with the ground illumination unit in accordance with exemplary embodiments of the invention. It is pointed out that other arrangements for the far field beacon light functionality are possible as well.

Figure 4A:
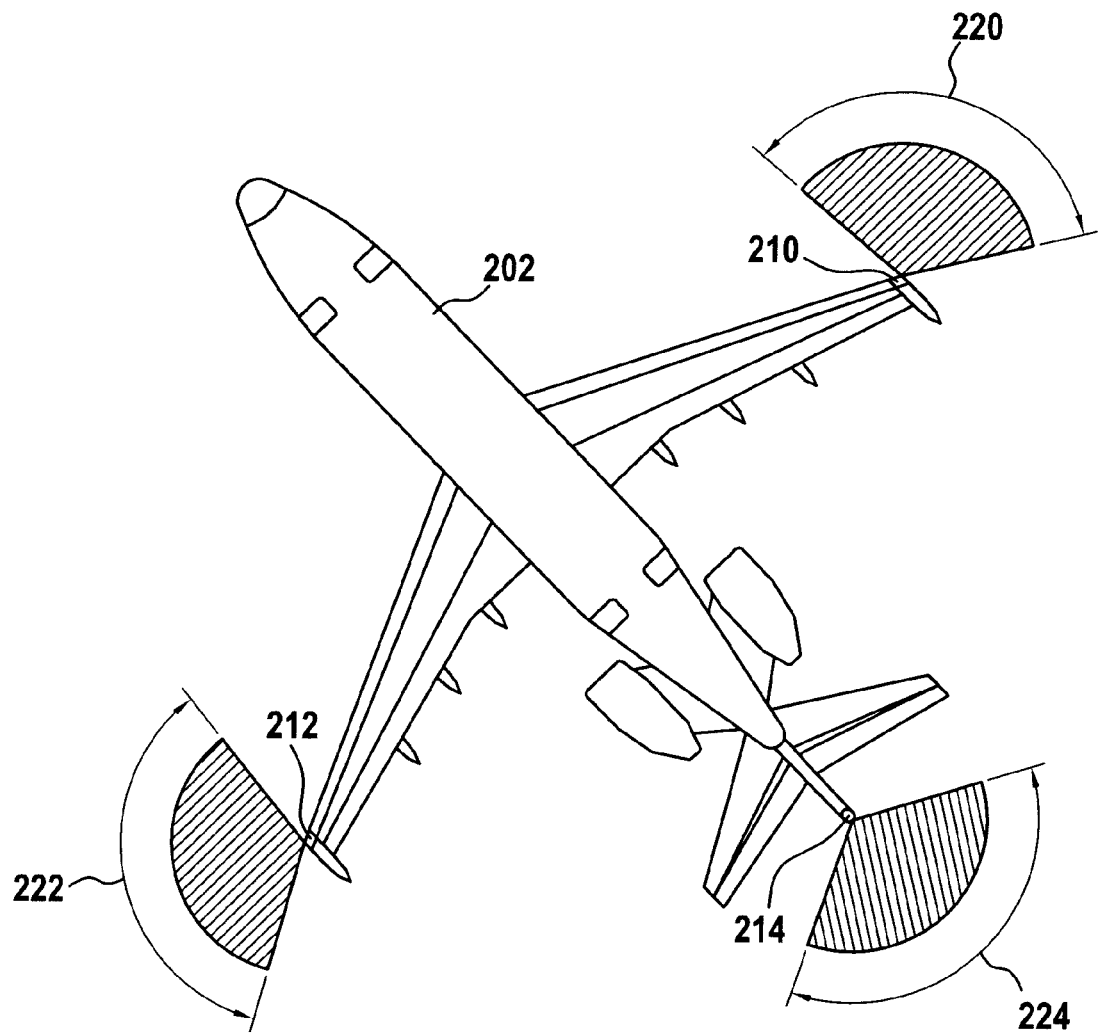
FIG. 4a-FIG. 4b shows an exemplary arrangement of a right wing tip, a left wing tip and a tail beacon light unit, which may be used together with a ground illumination aircraft light unit in accordance with an exemplary embodiment of the invention.

FIG. 4a shows an aircraft 202 equipped with a right wing tip beacon light unit 210, with a left wing tip beacon light unit 212, and with a tail beacon light unit 214.

The right wing tip beacon light unit 210 is positioned in the front of the right wing tip in flight direction. The left wing tip beacon light unit 212 is positioned in the front of the left wing tip in flight direction. The tail beacon light unit 214 is positioned at the very aft portion of the aircraft 202 and is centered with respect to the left-right extension of the aircraft 202.

FIG. 4a shows the horizontal light emission distributions of the right wing tip, left wing tip and tail beacon light units 210, 212, 214 in a schematic view. In particular, FIG. 4a shows the light intensity distributions of the right wing tip, left wing tip and tail beacon light units 210, 212, 214 in a horizontal cross-section through the right wing tip, left wing tip and tail beacon light units 210, 212, 214, which is also referred to as the second cross-sectional plane in the present document.

FIG. 4a illustrates the horizontal opening angles of the right wing tip, left wing tip and tail beacon light units 210, 212, 214, which opening angles are also referred to as second light emission opening angles in the present document. The right wing tip beacon light unit 210 has a right wing tip horizontal opening angle 220. The left wing tip beacon light unit 212 has a left wing tip horizontal opening angle 222. The tail beacon light unit 214 has a tail horizontal opening angle 224.

In the exemplary embodiment of FIG. 4a, the right wing tip horizontal opening angle 220 is about 125°, the left wing tip horizontal opening angle 222 is also about 125°, and the tail horizontal opening angle 224 is about 110°. The sum of these three horizontal opening angles 220, 222, and 224 is 360°. With a combined opening angle of 360° and no overlap between the horizontal opening angles due to the particular arrangement of the right wing tip, left wing tip and tail beacon light units 210, 212, 214, a 360° illumination in the horizontal plane with respect to the aircraft is made possible.

In the exemplary embodiment of FIG. 4a, the right wing tip horizontal opening angle 220 extends from 0° to −125° with respect to the flight direction, and the left wing tip horizontal opening angle 222 extends from 0° to −125° with respect to the flight direction. The tail horizontal opening angle 224 covers the remainder of the 360° with respect to the flight direction.

Figure 4B:
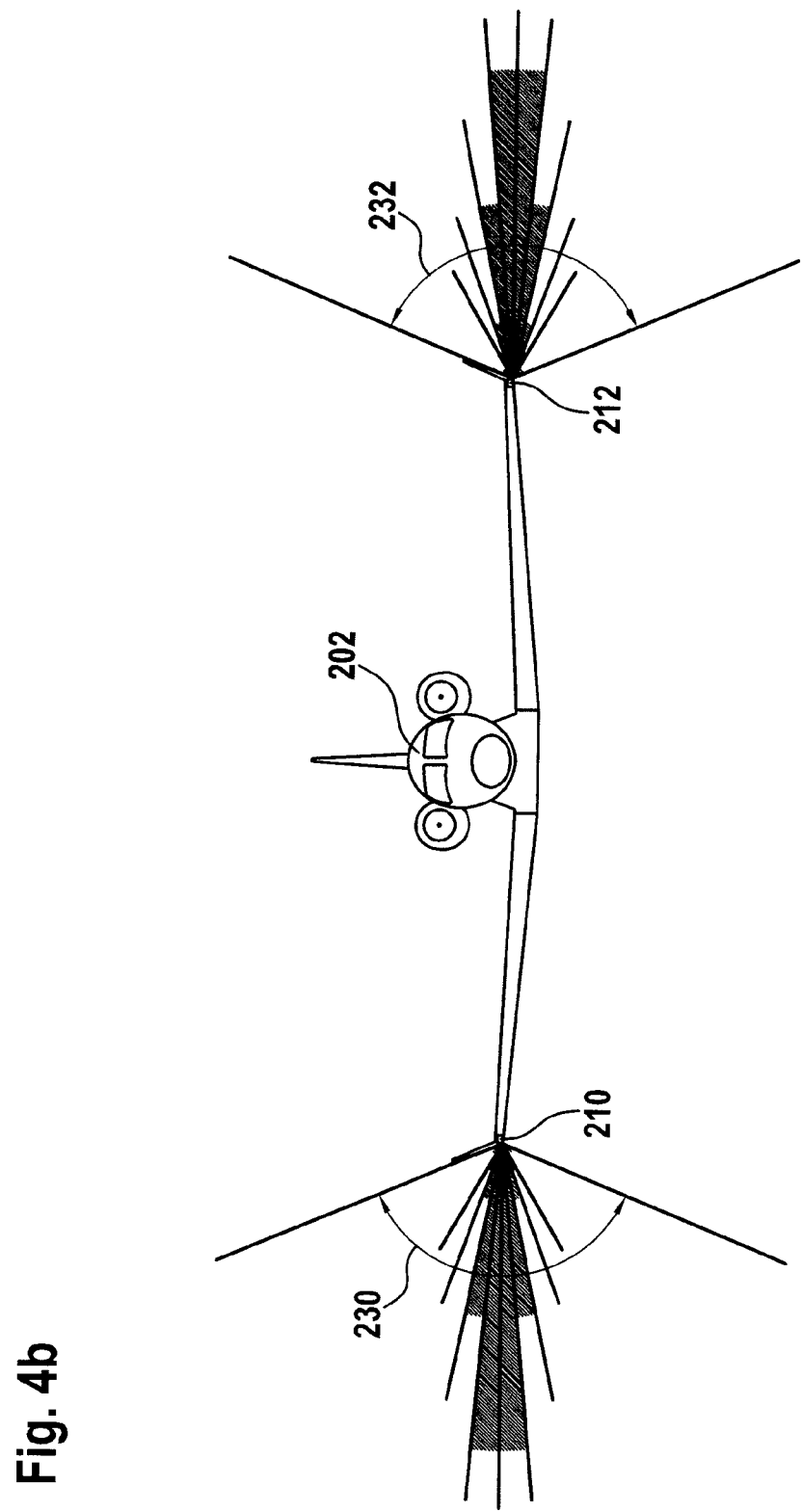

FIG. 4b shows the aircraft 202 of FIG. 4a in a front view. In the front view, the right wing tip beacon light unit 210 and the left wing tip beacon light unit 212 are visible. For both of these beacon light units 210 and 212, the respective vertical light emission distributions are shown in FIG. 4b. In particular, the vertical light emission distributions in the left-right cross-sectional plane through the two beacon light units 210 and 212 of the aircraft are shown. This vertical left-right cross-sectional plane is an exemplary first cross-sectional plane, as referred to at various points throughout this document. Other examples of first cross-sectional planes are other vertical cross-sectional planes that go through the respective right wing tip, left wing tip and tail beacon light unit.

In the exemplary embodiment of FIG. 4b, the right wing tip beacon light unit 210 has a right wing tip vertical opening angle 230, and the left wing tip beacon light unit 212 has a left wing tip vertical opening angle 232. These vertical opening angles are also referred to as first light emission opening angles throughout this document.

In the exemplary embodiment of FIG. 4b, the right wing tip vertical opening angle 230 is 150° and extends from +75° to −75° with respect to the horizontal direction. Analogously, the left wing tip vertical opening angle 232 is 150° and extends from +75° to −75° with respect to the horizontal direction.

Both of the right wing tip beacon light unit 210 and the left wing-tip beacon light unit 212 have a light intensity distribution in the exemplary cross-sectional plane as follows: The light intensity is 400 cd for a first angular range from −5° to +5° with respect to the horizontal direction. The light intensity is 240 cd in a second angular range, consisting of the sub-ranges from −10° to −5° and from +5° to +10°, with respect to the horizontal direction. The light intensity is 80 cd in a third angular range, consisting of two sub-ranges extending from −20° to −10° and +10° to +20° with respect to the horizontal direction. The light intensity is 40 cd in a fourth angular range, consisting of the sub-ranges from −30° to −20° and +20° to +30° with respect to the horizontal direction. The light intensity is 20 cd in a fifth angular range, consisting of the sub-ranges between −75° to −30° and +30° to +75° with respect to the horizontal direction. It is pointed out that the vertical light emission distributions of the right wing tip, left wing tip and tail beacon light units 210, 212, 214 may also have different shapes. They may in particular have continuous changes of light intensity values over the opening angle.

It is further pointed out that, in the exemplary embodiment of FIG. 4, the vertical light emission distribution of FIG. 4b is present for all vertical planes through one of the right wing tip, left wing tip and tail beacon light units 210, 212, 214. In this way an identical vertical light emission distribution is ensured over the whole 360° opening angle around the aircraft.

A flashing effect of the right wing tip, left wing tip and tail beacon light units 210, 212, 214 may be achieved via an according control thereof, as described above with respect to the ground illumination unit. Further, a revolving effect of the light emission around the aircraft may be achieved via an according synchronization of the right wing tip, left wing tip and tail beacon light units 210, 212, 214.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A set of beacon light units, comprising:
   a right wing tip beacon light unit,
   a left wing tip beacon light unit,
   a tail beacon light unit, and
   a ground illumination aircraft light unit with an operating light emission distribution for illuminating a ground area below an aircraft,
   wherein the ground illumination aircraft light unit is configured to be mounted to an underside of an aircraft fuselage,
   wherein the operating light emission distribution of the ground illumination aircraft light unit includes a straight downward emission direction normal to the ground area and covers a solid angle of illumination around the straight downward emission direction, wherein the solid angle of illumination is at least 1.3 π sr,
   wherein the ground illumination aircraft light unit is a beacon light unit, having a flashing mode of operation, and
   wherein each of the right wing tip beacon light unit, the left wing tip beacon light unit, the tail beacon light unit, and the ground illumination aircraft light unit is configured to emit red light flashes.

2. A set of beacon light units according to claim 1, wherein the solid angle of illumination of the ground illumination aircraft light unit is at least 1.65 π sr.

3. A set of beacon light units according to claim 1, wherein the operating light emission distribution of the ground illumination aircraft light unit encompasses a cone of illumination having an opening angle of at least 70° in all directions with respect to the straight downward emission direction.

4. A set of beacon light units according to claim 1, wherein the ground area below the aircraft, being illuminated in operation by the ground illumination aircraft light unit, encompasses a circular illuminated area, whose diameter is at least 70% of an extension of the aircraft at its point of largest extension.

5. A set of beacon light units according to claim 4, wherein an illuminance ratio between a point of highest illuminance and a point of lowest illuminance within a portion of the circular illuminated area having an angle of more than 20° with respect to the straight downward emission direction is at most 5.

6. A set of beacon light units according to claim 4, wherein an illuminance ratio between a point of highest illuminance and a point of lowest illuminance within a portion of the circular illuminated area having an angle of more than 20° with respect to the straight downward emission direction is at most 3.

7. A set of beacon light units according to claim 4, wherein an illuminance ratio between a point of highest illuminance and a point of lowest illuminance within a portion of the circular illuminated area having an angle of more than 20° with respect to the straight downward emission direction is at most 2.

8. A set of beacon light units according claim 1, wherein, for all positions outside of a fading distance from a ground position straight downward from the ground illumination aircraft light unit, illuminance values on the ground are below 10% of a maximum illuminance value in the ground area below the aircraft, with the fading distance being less than 65% of an extension of the aircraft at its point of largest extension.

9. A set of beacon light units according to claim 1, wherein the operating light emission distribution of the ground illumination aircraft light unit is substantially rotationally symmetric.

10. A set of beacon light units according to claim 1, wherein the ground illumination aircraft light unit comprises at least one LED for illuminating the ground area below the aircraft.

11. A set of beacon light units according to claim 1, wherein the ground illumination aircraft light unit is a combined beacon light and parking position signal light unit, having the flashing mode of operation and a continuous light emission mode of operation, with the ground illumination aircraft light unit having a switching circuit for selectively activating one of the flashing mode of operation and the continuous light emission mode of operation.

12. A set of beacon light units according to claim 1, wherein the ground illumination aircraft light unit provides near field illumination and wherein the right wing tip beacon light unit, the left wing tip beacon light unit and the tail beacon light unit provide far field illumination.

13. A set of beacon light units according to claim 1, wherein each of the right wing tip beacon light unit, the left wing tip beacon light unit and the tail beacon light unit has a respective warning light emission distribution, with the warning light emission distribution of each of the right wing tip beacon light unit, the left wing tip beacon light unit and the tail beacon light unit having:
   a first light emission opening angle of at least 150° in a first cross-sectional plane, and
   a second light emission opening angle of at most 180° in a second cross-sectional plane orthogonal to the first cross-sectional plane,
   wherein each of the right wing tip beacon light unit, the left wing tip beacon light unit and the tail beacon light unit is configured in such a way that it is mountable to the aircraft with the first cross-sectional plane being oriented in a vertical direction and the second cross-sectional plane being oriented in a horizontal direction, and wherein the first light emission opening angle extends at least 75° both above and below the second cross-sectional plane.

14. An aircraft comprising a set of beacon light units in accordance with claim 1.

15. A set of beacon light units according to claim 1, wherein the operating light emission distribution of the ground illumination aircraft light unit encompasses a cone of illumination having an opening angle of at least 80° in all directions with respect to the straight downward emission direction.

16. A set of beacon light units according to claim 1, wherein the ground area below the aircraft, being illuminated in operation by the ground illumination aircraft light unit, encompasses a circular illuminated area, whose diameter is at least 80% of an extension of the aircraft at its point of largest extension.

17. A set of beacon light units according to claim 1, wherein the ground area below the aircraft, being illuminated in operation by the ground illumination aircraft light unit, encompasses a circular illuminated area, whose diameter is at least 90% of an extension of the aircraft at its point of largest extension.

18. A set of beacon light units according claim 1, wherein, for all positions outside of a fading distance from a ground position straight downward from the ground illumination aircraft light unit, illuminance values on the ground are below 10% of a maximum illuminance value in the ground area below the aircraft, with the fading distance being less than 60% of an extension of the aircraft at its point of largest extension.

* * * * *